United States Patent
Viana et al.

(10) Patent No.: US 10,892,963 B2
(45) Date of Patent: Jan. 12, 2021

(54) SYSTEM AND METHOD FOR DETERMINING BANDWITH USAGE FROM A PLURALITY OF SUBSCRIBERS IN A CABLE NETWORK

(71) Applicant: Incognito Software Systems Inc., Vancouver (CA)

(72) Inventors: Francisco Frederico Lima Viana, North Vancouver (CA); Christoph Schwarz, Burnaby (CA)

(73) Assignee: Incognito Software Systems, Inc., Vancouver (CA)

( * ) Notice: Subject to any disclaimer, the term of this patent is extended or adjusted under 35 U.S.C. 154(b) by 8 days.

(21) Appl. No.: 16/325,661

(22) PCT Filed: Aug. 15, 2016

(86) PCT No.: PCT/CA2016/050957
§ 371 (c)(1),
(2) Date: Feb. 14, 2019

(87) PCT Pub. No.: WO2018/032082
PCT Pub. Date: Feb. 22, 2018

(65) Prior Publication Data
US 2019/0207833 A1   Jul. 4, 2019

(51) Int. Cl.
*G06F 15/173*   (2006.01)
*H04L 12/26*    (2006.01)
(Continued)

(52) U.S. Cl.
CPC .......... *H04L 43/06* (2013.01); *H04L 12/2898* (2013.01); *H04L 12/4625* (2013.01); *H04L 43/04* (2013.01)

(58) Field of Classification Search
CPC ..... H04L 43/06; H04L 12/4625; H04L 43/04; H04L 12/2898
(Continued)

(56) References Cited

U.S. PATENT DOCUMENTS

| 6,751,663 B1 * | 6/2004 | Farrell | H04L 63/08 709/223 |
| 7,130,901 B2 | 10/2006 | Roach | |

(Continued)

OTHER PUBLICATIONS

The International Search Report and the Written Opinion of the International Searching Authority for International Application No. PCT/CA2016/050957 dated Apr. 13, 2017.

(Continued)

*Primary Examiner* — Johnny B Aguiar
(74) *Attorney, Agent, or Firm* — Warner Norcross + Judd LLP

(57) ABSTRACT

A system for determining bandwidth usage from a plurality of subscribers in a cable network; the system including an engine component comprising a computer processor receiving data from an Internet Protocol Detail Record (IPDR) module and from a subscriber module; the engine component configured to receive requests from an Application Programming Interface (API) module to retrieve or manipulate data and to return a reporting result; the IPDR module collecting IPDR data from a plurality of cable modem termination systems (CMTS); and wherein the data collected by the IPDR module from the plurality of CMTS is normalized by the IPDR module executing a normalization algorithm prior to the engine component returning a reporting result.

13 Claims, 2 Drawing Sheets

ARCHITECTURE / SERVICE COMPONENTS

(51) Int. Cl.
*H04L 12/46* (2006.01)
*H04L 12/28* (2006.01)

(58) Field of Classification Search
USPC .................................. 709/223, 224; 455/405
See application file for complete search history.

(56) References Cited

U.S. PATENT DOCUMENTS

| | | | |
|---|---|---|---|
| 8,326,958 | B1 | 12/2012 | Raleigh |
| 8,762,517 | B2 | 6/2014 | Woundy et al. |
| 8,897,745 | B2 * | 11/2014 | Davis ................... H04M 15/41 |
| | | | 455/405 |
| 8,935,389 | B2 | 1/2015 | Pedigo et al. |
| 2004/0264405 | A1 * | 12/2004 | MacGregor Scobbie ................... |
| | | | H04M 15/55 |
| | | | 370/328 |
| 2008/0086557 | A1 * | 4/2008 | Roach .................... H04L 67/28 |
| | | | 709/224 |
| 2008/0262990 | A1 * | 10/2008 | Kapoor ............... H04L 63/1408 |
| | | | 706/20 |
| 2012/0297061 | A1 * | 11/2012 | Pedigo ................. H04L 67/327 |
| | | | 709/224 |
| 2015/0312795 | A1 * | 10/2015 | Chou .................... H04W 24/02 |
| | | | 370/252 |
| 2015/0363451 | A1 * | 12/2015 | Ince ..................... G06F 16/254 |
| | | | 707/602 |

OTHER PUBLICATIONS

Bourque, "FAQ: Bandwidth Monitoring with IPDR", Internet Article, Apr. 16, 2013, retrieved Apr. 7, 2017 at https://www.incognito.com/tips-and-tutorials/faq-bandwidth-monitoring-with-ipdr/.

Incognito Software Systems Inc., "IPDR vs. DPI: The Battle for Big Data", Internet Article: An Incognito White Paper, Jan. 2016, retrieved Apr. 7, 2017 at https://www.incognito.com/wp-content/uploads/WP_IPDR-vs-DPI.pdf.

Active Broadband Networks, Inc., "Understanding IPDR Service Flow Counters for Usage Metering Applications", Internet Article: A white paper prepared by Active Broadband Networks, Inc., Mar. 2010, retrieved on Apr. 7, 2017 at http://www.dslreports.com/r0/download/1603814~d44a19780841cdc79abf840b6066d52d/ipdr-usage-counters.pdf.

Yang, et. al., "A light-weight periodic data collection approach of TR-069 managed CPEs", Network Operations and Management Symposium (SPNOMS), Sep. 25-27, 2012.

* cited by examiner

SYSTEM AND METHOD FOR DETERMINING BANDWITH USAGE FROM A PLURALITY OF SUBSCRIBERS IN A CABLE NETWORK

TECHNICAL FIELD

The invention relates generally to the management of shared access network resources, and in particular to collection, reconciliation and normalization of internet protocol detail record.

BACKGROUND

Generally, residential and commercial internet or telecommunications networks tend to send and receive data through connection points to one or more high speed data networks, particularly cable networks. These connection points are often shared by a number of subscribers. Detailed and accurate reporting on the bandwidth activity of each individual subscriber is necessary to gauge the bandwidth usage of each individual subscriber, such as for billing purposes.

One existing method for gathering data from internet protocol networks is the IPDR (Internet Protocol Detailed Record) technology, which is used to collect and record data traffic statistics that are produced on a network. IPDR is a two-way standardized interface that enables the collection and re-distribution of data found in any Internet Protocol (IP) system. IPDR data collection may be used for capacity management, billing, customer experience management, performance management, fraud prevention, marketing analysis, revenue assurance, traffic analysis and usage accounting, for example. The IPDR data is generally extracted via software modules installed on cable modem termination system or CMTS and this data is then communicated to some sort of data output module for generating bandwidth activity reports.

Generally, IPDR data is generated in Subscriber Account Management Interface Specification (SAMIS) format. The SAMIS format is specified by the Data-over-cable Service Interface Specifications (DOCSIS). Octet counters received in SAMIS IPDR are values representing the number of bytes that have been transmitted on a particular service flow from the start of the service flow until a given timestamp that is transmitted along with the given counter value. However, there are some problems with this approach as the information derived from different cable modem termination system manufactures are not always suitable for advanced analytics. For example, (a) the time interval can be very long, whereas the counters are simply snapshots; (b) IPDR data assumes cable modems have two service flows (one upstream and one downstream), however there can be more than two in practice; (c) there are two types of counter values: interim and stop; (d) while most cable modems operate on 64 bit counters, some legacy units use 32 bit counters, which results in counters wrapping around their 0 mark at different times.

Accordingly, there is a need in the art for an improved method and system for collecting and reporting on internet bandwidth data usage by multiple subscribers.

SUMMARY OF THE INVENTION

In one general aspect of the invention, there is disclosed a system for determining the inconsistencies from the cable modem termination systems and determining bandwidth usage from a plurality of subscribers in a cable network; the system including an engine component comprising a computer processor receiving data from an Internet Protocol Detail Record (IPDR) module and from a subscriber module; the engine component configured to receive requests from an Application Programming Interface (API) module to retrieve or manipulate data and to return a reporting result; the IPDR module collecting IPDR data from a plurality of cable modems; and the data collected by the IPDR module from the plurality of cable modems is normalized by the IPDR module executing a normalization algorithm prior to the engine component returning a reporting result.

In one aspect, the plurality of cable modems bandwidth utilization are accessed by the IPDR module via one or more a cable modem termination systems (CMTS).

In another aspect, the IPDR collection module executing the normalization algorithm pairs upstream and downstream service flows.

In another aspect, the IPDR collection module executing the normalization algorithm further calculates delta values representing the number of bytes of data uploaded and downloaded by each cable modem between a time $T_1$ and $T_2$.

In another aspect, the IPDR collection module executing the normalization algorithm further adapts data from timers based on 32 bit counters and those based on 64 bit counters to a common counter.

In another aspect, the IPDR collection module executing the normalization algorithm further creates and destroys service flows.

In another aspect, the IPDR collection module executing the normalization algorithm further distributes upload and download usage occurring with varying time intervals onto fixed time intervals.

In another aspect, the IPDR collection module executing the normalization algorithm pairs upstream and downstream service flows based on: upon a condition in which a given service flow has a service class name, then pair the given service flow with another service flow that goes in the opposite direction and has a similar name; upon a condition in which a service flow does not have a service class name then it is paired with other service flows that do not have service class names and that go in either direction; upstream and downstream service flows are only be paired if their begin times are no more than five seconds apart; and, upstream and downstream service are only paired if their end times are no more than five seconds apart.

In another aspect, the reporting result is a report of bandwidth activity for one or more of the cable modems clean of error and variations caused by the multiple different implementation of the various cable modem termination system manufacturers.

In another general aspect of the invention, a method for determining bandwidth usage from a plurality of subscribers in a cable network; the method includes receiving data by an engine component comprising a computer processor from an Internet Protocol Detail Record (IPDR) module and from a subscriber module; the engine component configured to receive requests from an API module to retrieve or manipulate data and to return a reporting result; collecting IPDR data by the IPDR module from a plurality of cable modems; normalizing the IPDR data collected from the plurality of cable modems prior to the engine component returning a reporting result.

In another aspect, the plurality of cable modems are accessed by the IPDR module via one or more a cable modem termination systems (CMTS).

In another aspect, the method further includes pairing upstream and downstream service flows by the IPDR module.

In another aspect, the method further includes calculating by the IPDR module delta values representing the number of bytes of data uploaded and downloaded by each cable modem between a time $T_1$ and $T_2$.

In another aspect, the method further includes adapting by the IPDR module data from timers based on 32 bit counters and those based on 64 bit counters to a common counter.

In another aspect, the method further includes creating and destroying service flows by the IPDR module.

In another aspect, the method further includes distributing upload and download usage occurring with varying time intervals onto fixed time intervals.

In another aspect, the method further includes pairing upstream and downstream service flows based on: upon a condition in which a given service flow has a service class name, then pair the given service flow with another service flow that goes in the opposite direction and has a similar name; upon a condition in which a service flow does not have a service class name then it is paired with other service flows that do not have service class names and that go in either direction; upstream and downstream service flows are only be paired if their begin times are no more than five seconds apart; and, upstream and downstream service are only paired if their end times are no more than five seconds apart.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

Figure 1:
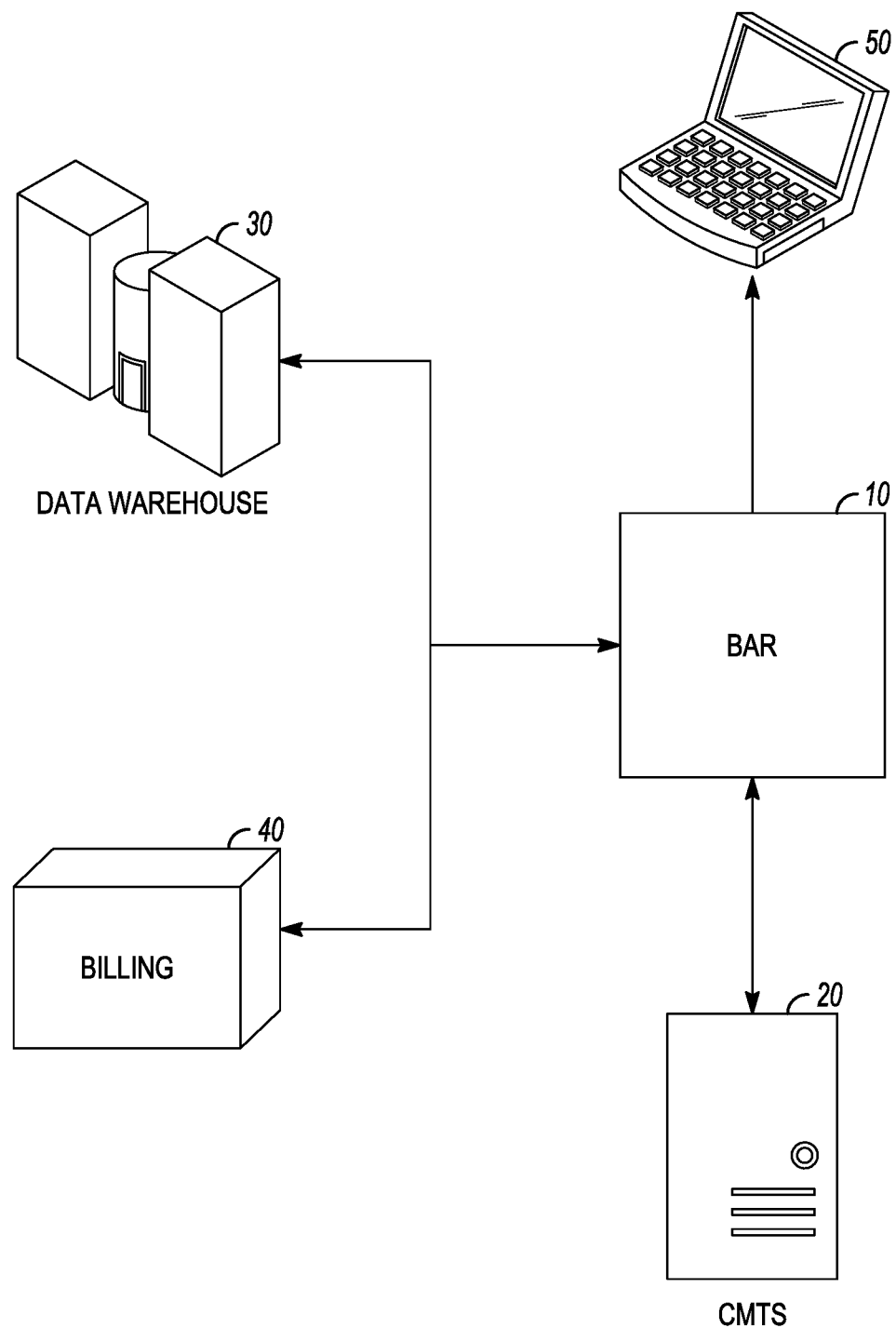
FIG. 1 shows a cable internet network making use of the Bandwidth Activity Reporter of the invention.

Having summarized the invention above, certain exemplary and detailed embodiments will now be described.

It will be understood by those of ordinary skill in the art that the embodiments described herein may be practiced without these specific details. In other instances, well-known methods, procedures and components have not been described in detail so as not to obscure the embodiments generally described herein. Furthermore, this description is not to be considered as limiting the scope of the embodiments described herein in any way, but rather as merely describing the implementation of various embodiments as presented here for illustration.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. In certain embodiments, the computer may be a digital or any analogue computer.

Program code is applied to input data to perform the functions described herein and to generate output information. The output information is applied to one or more output devices, in known fashion.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g., read-only memory (ROM), magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, and the like. Non-transitory computer-readable media comprise all computer-readable media, with the exception being a transitory, propagating signal. The term non-transitory is not intended to exclude computer readable media such as a volatile memory or random access memory (RAM), where the data stored thereon is only temporarily stored. The computer useable instructions may also be in various forms, including compiled and non-compiled code.

Referring now to FIG. 1, there is shown a general exemplary system arrangement of the implementation of a bandwidth activity reporter (BAR) module 10. The BAR module 10 is arranged to be in data communication with a cable modem termination system (CMTS) 20, from where subscriber and usage data is extracted. The CMTS 20 is a hardware device where subscriber network connections terminate. The operation of a CMTS 20 is well known in the art and otherwise not described in further detail herein. While only a single CMTS 20 is illustrated, the BAR 10 is fully capable of communicating with and exchanging data with a plurality of CMTS devices. The BAR 10 is also in data communication with sources of subscriber data such as account data stored on a data storage 30 and a database containing billing data 40. Finally, an end-user computer system 50 receives data from BAR 10 for further analysis, display and output.

With the BAR 10 thus arranged, it becomes possible to understand how and where bandwidth is being used on a broadband network. Internet subscribers demand speed and reliability in a world of increased Internet traffic, a proliferation of IP devices, and the growing popularity of high-bandwidth applications and over-the-top services. Gathering this network and subscriber utilization information has traditionally been a challenge involving multiple disparate data sets and requiring dedicated resources that produce imprecise results. The BAR 10 is a tool that could automatically provide accurate insight into subscribers' usage habits to help identify heavy users, create upsell campaigns based on utilization, implement fair usage policies, pinpoint peak usage periods, spot areas of network congestion, and ultimately provide a higher quality of experience. The BAR 10 delivers the insight needed to monitor bandwidth usage and better target areas where network investment is needed. Specifically, it provides a way to determine where a cable company could focus its investment in upgrading network infrastructure so that areas where the infrastructure under the heaviest loads can be prioritized. The BAR 10 offers comprehensive network intelligence reports and metrics, allowing network operators to see exactly how and where bandwidth is used. No matter where they are, network administrators, engineers, and product managers alike can access essential data through a web-interface via system 50. By gathering per-subscriber service usage information through Internet Protocol Detail Record (IPDR), the BAR 10 processes and organizes the cable network data into trends and reports that can help cable operators make smarter business decisions—from network planning, and service experience enhancement, to subscriber usage monetization and fair usage policies. On top of helping to identify subscribers who have exceeded their bandwidth quotas, BAR 10 helps manage network congestion by sending automated usage alerts to heavy users when necessary. If these subscribers continue their usage trend and/or does not wish to purchase a bandwidth upgrade, the solution can then facilitate speed reduction policies.

The BAR 10 typically acts as a raw IPDR stream collector, data refinement engine, and reporting platform that collects and normalizes IPDR records to generate usage details. It automatically collects data from the CMTS regardless of the DOCSIS version or CMTS vendor. This method of data collection ensures operational efficiency that does not overstrain hardware. The high-performance processing engine correlates DOCSIS service flow events with subscriber account data from subscriber data warehouses, billing platforms and network information to deliver key metrics in the form of reports, spreadsheets, and location-aware heat maps.

In addition, the BAR 10 may facilitate a greater understanding of traffic patterns, peak congestion periods, and broadband usage patterns to boost subscriber quality of experience. Through a rich collection of metrics and predefined reports such as CMTS utilization, upstream and downstream bandwidth consumption, and DOCSIS network statistics, a cable company may be able to make informed decisions on network traffic management and service quality enhancement.

Cable service providers are seeing increasing cases of abusive bandwidth consumption. While some providers are taking a wait-and see approach, others are implementing warnings and fair access policies. BAR 10 identifies subscribers who have consumed their Internet service quotas and automatically sends usage notifications. For service providers who are implementing fair access policies, the subscriber has the choice of purchasing a short-term plan upgrade, changing their subscription plan, or taking no action which could result in an automatic speed reduction for the remainder of the billing cycle. All this can be automated through BAR 10 based on business policies. Throttle high usage subscribers during network congestion periods with automated policies that enforces fair access based on user-specific criteria, and determine if implemented policies are working effectively with detailed congestion management information. By differentiating between proprietary services such as IPTV and voice from other Internet traffic, BAR 10 excludes the bandwidth consumption of those services from the subscribers' internet quota. This means that the quality of those services would never be affected when a subscriber's Internet speed is reduced.

Network planners are constantly trying to stretch resources and plan ways to give subscribers the best possible quality of experience (QoE). The challenge is to accurately identify areas of network congestion, pinpoint peak periods, and make the right investment at the right time. However, too often these important decisions are driven by trial and error due to difficulty reconciling separate silos of information. Take the guesswork out of network planning with BAR 10. This solution delivers the insight needed in a simple-to-understand format to accurately monitor bandwidth usage, track trends, and improve QoE where it is needed most.

BAR 10 processes service statistics and per-subscriber usage information into usable metrics. IPDR collects critical data about every subscriber device on the network without affecting network performance or overstraining your hardware because data is periodically collected out of band, regardless of your DOCSIS version or CMTS vendor. BAR 10 has a high performance engine that normalizes, compresses, and centrally stores this data to deliver key metrics to help you make informed business decisions.

BAR 10 may also be used to quickly find and cross-reference different data points to understand traffic patterns and usage in a particular location. This solution correlates service flow events with account information and network data so that all the information a cable company needs to make a decision is readily available. For example, the engineering team may recommend reallocating CMTS equipment on a network to improve customer QoE in fast growing regions. To make an informed decision, the following data points are available via BAR 10 (a) where premium subscribers are located; (b) where residential and commercial customers are located; (c) where traffic congestion is a problem; and, (d) where subscriber numbers are growing.

With the BAR 10, it is possible to pull-up this data in an instant through the web-based interface via system 50. Engineers can then work with management and other stakeholders to decide whether to invest in areas with higher traffic, larger concentration of premium subscribers, or areas that show the highest rate of subscriber growth.

Figure 2:
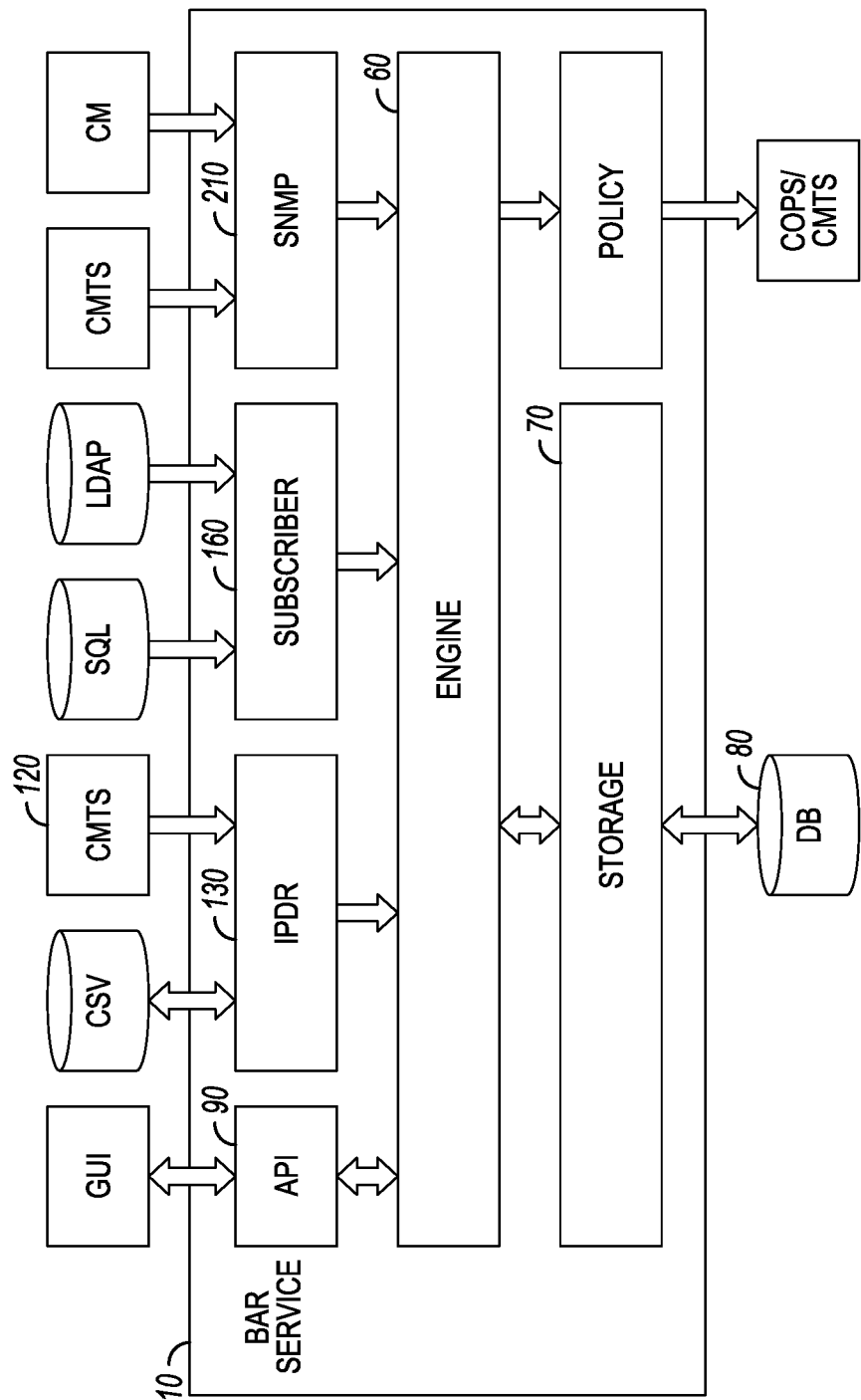
FIG. 2 is a detailed view of the Bandwidth Activity Reporter of FIG. 1 according to the invention.

Turning to FIG. 2, a particular implementation of BAR 10 is shown. In the preferred implementation, BAR 10 is a C++ service that builds on existing network infrastructure. Each of the components shown in FIG. 2 may operate independently and be in communication with each other component. This independent operation allows each component to be responsible for managing its own resources such as memory, file descriptor and socket objects. The components making up the BAR 10 may also be physically located in different places.

Each service provider in communication with the BAR 10 is registered with the framework and initialized/configured at service startup, terminated at shut-down, and optionally re-configured during runtime. Each provider creates a global variable by which it can be found by other providers.

The BAR system 10 includes an engine component which includes a computer processor that operates much of the BAR 10. The engine 60 is configured to receive data from IPDR 130, from subscriber module 160, and from the optional Simple Network Management Protocol (SNMP) module 210; and to store this received data permanently or semi-permanently in a computer readable data storage 70 and optionally in a longer term, remote storage 80. The engine 60 receives requests from the API 90 to either retrieve data or to perform one or more operations on accessible and data and to return the result. Due to the amount of data being retrieved, processed or otherwise acted upon by the engine 60, the engine 60 is expected to allocate a large amount of memory and is therefore a generally powerful computer system. The memory required is generally in the order of tens of gigabytes. Finally, the engine 60 sets the policy and operating parameters of all components in the system.

Storage 70 is a computer readable medium accessibly by engine 60 and provides a permanent data store for the engine's data. In the preferred embodiment, storage 70 may use a database such as a NoSQL database, or may alternatively be a customized storage solution. The storage 70 defines an interface that is datastore independent so that the actual storage engine can be replaced easily; and preferably while the service is running.

The optional SNMP module 210 could be used to collect SNMP data. However, this data can be expensive to collect and is sometimes restricted by certain cable operators.

The API module 90 provides access to the data in the storage component, preferably by being in direct communication with the storage module. The API 90 handles authentication and access right checks, validation of input values, data conversion and other such tasks related to the user's interaction and possible customization of the BAR.

The subscriber module 160 is responsible for importing subscriber related data from third-party systems; and supports importing data from CSV files, SQL databases via ODBC (for example), LDAP databases and mapping this data onto the incoming IPDR data.

IPDR module 130 as herein described presents an improvement over the prior art, and in particular with respect to normalizing internet traffic data received from different sources, as will be appreciated by one skilled in the art in view of the description below. IPDR module 130 is responsible for collecting IPDR data either directly from one or more CMTS devices 120 or indirectly from data files exported from the CMTS devices 120. Such data files may be generated by IPDR software installed on CMTS devices 120 or by intermediary third-party solutions capable of generating such data.

The IPDR module 130 may support various protocols and forms of data collection, including but not limited to SAMIS data collection in concert with manufacturers and operators of the CMTS devices, XDR (External Data Representation) sources, and IPDR/SP protocol sources. In addition, the IPDR module 130 supports deviations from the DOCSIS standard that are implemented on CMTS devices. These deviations are typically implemented by manufacturers of particular CMTS devices to provide custom functionality specific to each manufacturers' device or intended customer. With respect to receiving data from data files, the IPDR module 130 also supports the import and export of SAMIS data in CSV format. Finally, the IPDR module 130 supports actively establishing connections to one or more CMTS devices 120.

Where data is retrieved by IPDR module 130 from a number of different sources, unless the sources are all coordinated, the possibility exists that the data is not in a consistent enough structure or arrangement to permit required analytics. This could be due to a number of reasons, but generally, octet counters received in SAMIS IPDR are values representing the number of bytes that have been transmitted on a particular service flow from the start of the service flow until a given timestamp that is transmitted along with the counter value. Information in this format may not suitable for any analytics for a number of reasons, including (a) the time interval can be very long, the counters are just snapshots; (b) a CM has at least two service flows (1 upstream, 1 downstream), it can have more than two; (c) service flows can be created/destroyed any time; (d) there are two types of counter values: interim and stop; (e) some CMTS devices do not use 64 bit, but 32 bit counters resulting in the possibility that counters can wrap around. For example, given a 15 minute collection interval and a 32 bit counter starting a 0, the counter would wrap around if the modem was downloading at a speed of at least 38,177,487 bits per second for the entire 15 minute period (equal to approx. 36 MBit/s). As counters can have any value at the start of a 15 minute interval, and 32 bit are only 4 Gigabyte, a wraparound is very likely and can happen any time.

For these reasons, the data must first be converted into a schema that is suitable for running analytics on. This process is referred to as normalization in this description, and preferably includes the following steps (a) pairing upstream and downstream service flows; (b) calculating delta values between time intervals and specifying upload and download data per delta value, so information is stored as being "between time $T_1$ and $T_2$ the CM has uploaded N bytes and downloaded M bytes"; (c) handling 32 bit counter wraparounds and 64 bit counter data in different ways; (d) handling creation and destruction of service flows and therefore the creation and destruction of counters, together with the interim and stop events; (e) distributing usage that occurs with varying time intervals onto fixed time intervals. The BAR service can operate on a 15, 20, 30 or 60 minute granularity as selected by a predefined configuration parameter. Fixed time intervals always start at a multiple of the granularity or zero, such that for the 15 minute granularity, fixed time intervals start at minutes 0, 15, 30 and 45 of an hour, for the 20 minute granularity, fixed time intervals start at minutes 0, 20 and 40 of an hour, for the 30 minute granularity, fixed time intervals start at minutes 0 and 30 of an hour, and for the 60 minute granularity, fixed time intervals start at minute 0 of an hour. It will be understood that not all of these steps are necessarily present if the IPDR data does not require them to be performed. However, a determination may be made by the IPDR module 130 as to which steps are required based on the specific operating conditions.

With respect to pairing upstream and downstream service flows, the IPDR module 130 implements the following rules (i) if a service flow has a service class name, then is paired with another service flow that goes into the opposite direction and has a similar name; (ii) if a service flow does not have a service class name then it is paired with other service flows that do not have service class names and that go in either direction; (iii) service flows can only be paired if their begin times are no more than five seconds apart; (iv) service flows can only be paired if their end times are no more than five seconds apart.

Delta value rules may be calculated using the following approach, given a counter value of N at a time T from the IPDR data:

Consider the CMTS host name, CM MAC address, service flow ID and service creation time when checking if there is a previous time and value for this counter (i.e. checking if this service flow is a known or a new service flow).

If there is no previous time and value for a given counter (i.e. it is a new service flow), then
consider the age A of the service flow; if A is less than the service's granularity, calculate the previous time as T-A and assume the previous value to be zero. Then consider the delta to be equal to N and the time interval T-A to T.
if the service flow is older than the service's granularity then do not calculate a delta value at this point, consider this a data inconsistency
if there is a previous time Tp and value Np for this counter (i.e. it is a known service flow) then:
  if T is earlier than or equals Tp: ignore this record, do not calculate a delta value, this is a data inconsistency (possibly old records being reread)
  if T is later than Tp:
    if age of service flow A is less than the previous age of this service flow Ap:
      if A is less than the service's granularity: calculate Tp as T-A, and assume time interval Tp to T and set delta value=N (after a reboot the service flows might be recreated with the same IDs and their octet counters set to zero).
      otherwise: consider this a data inconsistency, do not calculate a delta value
    otherwise calculate delta value as N-Np and time interval as Tp to T.
if a delta value has been calculated and the delta is negative then the counter might be 32 bit and might have wrapped. In this case:
  if direction is upstream and N<$2^{32}$ and Np<$2^{32}$: calculate delta as N-Np+$2^{32}$
  otherwise this is a data inconsistency, and do not calculate a delta value Next, it is necessary to assign delta values to fixed time intervals. This assignment procedure follows these rules:
A delta value is always associated with a variable time interval. This time interval is very likely not exactly the same as the fixed time intervals that the BAR module operates on. The variable delta time interval might fully or partially overlap with one or more of BAR module's fixed time intervals.
A delta value is distributed onto the fixed time intervals based on how many seconds the variable delta time interval and the fixed time interval overlap and how long the total delta time interval is. A particular fixed time interval is assigned a number of octets according to the following formula:
  total delta octets/length of delta time interval in seconds*overlap of delta time interval with fixed time interval in seconds
In the special case where delta time interval falls entirely into a single fixed time interval, the length of the delta time interval is equal to the overlap of the delta time interval with the fixed time interval, so all of the total delta octets are assigned to the fixed time interval
The above formula can yield fractions of an octet. When assigning octet counts to multiple intervals, the octet count as returned by the formula is rounded down to the next lowest integer. The value for the last interval is not determined by the formula, but instead calculated as the number of total octets minus the number of octets assigned to all other intervals (i.e. the "remainder"). This way always the exact amount of octets is distributed, not a single octet is lost or added due to rounding errors.

Following the above processing, terminated service flows are preferably retained for a predetermined period of time, such as for 1 day to safeguard against a service flow being processed more than once (e.g. via import files) and thus creating the same usage data multiple times.

Usage records may be created if there is at least one service flow in the usage record, or if no data inconsistency has been detected for any of the service flows in this usage record, or if at least one of the calculated delta values in the usage record is greater than zero (i.e. do not create zero value usage records)

Example

In this example, the situation given does not consider wrap arounds and new service flow creation, and assuming that there are exactly two service flows, one upstream and one downstream:
From the raw IPDR data, the service got the information that a particular CM at time $T_1$ had an upstream octet counter value of $N_1$ and at time $T_2$ the same upstream counter had the value of $N_2$. In addition, it got the information that at time $T_{1.2}$ the downstream counter had a value of $M_1$, and at time $T_{2.2}$ the downstream counter had a value of $M_2$. Times $T_1$ and $T_{1.2}$ are less than five seconds apart. Likewise, times $T_2$ and $T_{2.2}$ are less than five seconds apart. With all this information, the BAR service can now create a delta record containing the information that between times $T_1$ and $T_2$ this modem uploaded $N_2-N_1$ bytes and downloaded $M_2-M_1$ bytes. (For the sake of pairing it ignores the fact that the upstream counter times do not exactly match the downstream counter times). This delta record with its associated variable time interval $T_1$ and $T_2$ is then distributed onto the fixed time intervals as described above.

The aforementioned embodiments have been described by way of example only. The invention is not to be considered limiting by these examples and is defined by the claims that now follow.

What is claimed is:

1. A system for determining bandwidth usage from a plurality of subscribers in a cable network; the system comprising
  an engine component comprising a computer processor receiving data from an Internet Protocol Detail Record (IPDR) collection module and from a subscriber module; the engine component configured to receive requests from an Application Programming Interface (API) module to retrieve or manipulate data and to return a reporting result;
  the IPDR collection module collecting IPDR data from a plurality of cable modems;
  and wherein the IPDR data collected by the IPDR collection module from the plurality of cable modems is normalized by the IPDR collection module executing a normalization algorithm prior to the engine component returning the reporting result;
  wherein the IPDR collection module executing the normalization algorithm further:
    calculates delta values representing a number of bytes of data uploaded and downloaded by each cable modem between a time $T_1$ and $T_2$;
    and wherein the IPDR collection module executing the normalization algorithm pairs upstream and downstream service flows based on:
      upon a condition in which a given service flow has a service class name, then pair the given service flow with another service flow that goes in the opposite direction and has a similar name;
      upon a condition in which a service flow does not have a service class name then the service flow is paired with other service flows that do not have service class names and that go in either direction;

the upstream and downstream service flows are only paired in response to the upstream and downstream service flows' begin times being no more than five seconds apart; and, the upstream and downstream service flows are only paired in response to the upstream and downstream service flows' end times being no more than five seconds apart.

2. The system according to claim 1, wherein the plurality of cable modems are accessed by the IPDR collection module via one or more cable modem termination systems (CMTS).

3. The system according to claim 1, where the IPDR collection module executing the normalization algorithm further:

adapts data from timers based on 32 bit counters and timers based on 64 bit counters to a common counter.

4. The system according to claim 3, where the IPDR collection module executing the normalization algorithm further:

creates and destroys service flows.

5. The system according to claim 4, where the IPDR collection module executing the normalization algorithm further:

distributes upload and download usage occurring with varying time intervals onto fixed time intervals.

6. The system according to claim 1, wherein the reporting result is a bandwidth activity report for one or more of said cable modems.

7. A method for determining bandwidth usage from a plurality of subscribers in a cable network; the method comprising receiving data by an engine component comprising a computer processor from an Internet Protocol Detail Record (IPDR) collection module and from a subscriber module; the engine component configured to receive requests from an Application Programming Interface (API) module to retrieve or manipulate data and to return a reporting result;

collecting IPDR data by the IPDR collection module from a plurality of cable modems;

normalizing the IPDR data collected from the plurality of cable modems prior to the engine component returning the reporting result;

further comprising pairing upstream and downstream service flows by the IPDR collection module wherein pairing the upstream and downstream service flows based on:

upon a condition in which a given service flow has a service class name, then pair the given service flow with another service flow that goes in the opposite direction and has a similar name;

upon a condition in which a service flow does not have a service class name then the service flow is paired with other service flows that do not have service class names and that go in either direction;

the upstream and downstream service flows are only paired in response to the upstream and downstream service flows' begin times being no more than five seconds apart; and, the upstream and downstream service flows are only paired in response to the upstream and downstream service flows' end times being no more than five seconds apart.

8. The method according to claim 7, wherein the plurality of cable modems are accessed by the IPDR collection module via one or more cable modem termination systems (CMTS).

9. The method according to claim 7, further comprising calculating by the IPDR collection module delta values representing the number of bytes of data uploaded and downloaded by each cable modem between a time $T_1$ and $T_2$.

10. The method according to claim 9, further comprising adapting by the IPDR collection module data from timers based on 32 bit counters and timers based on 64 bit counters to a common counter.

11. The method according to claim 10, further comprising creating and destroying service flows by the IPDR collection module.

12. The method according to claim 11, further comprising distributing upload and download usage occurring with varying time intervals onto fixed time intervals.

13. The method according to claim 7, wherein the reporting result is a bandwidth activity report for one or more of said cable modems.

* * * * *